S. C. Rundlett.
Revolving Rake.
No 44824. Patented Oct. 25, 1864.

Witnesses.
Henry Moore
Wm. F. McNamara

Inventor.
Saml. C. Rundlett
per Munn & Co
Attys

UNITED STATES PATENT OFFICE.

SAML. C. RUNDLETT, OF PORTLAND, MAINE.

IMPROVEMENT IN REVOLVING HAND-RAKES.

Specification forming part of Letters Patent No. 44,824, dated October 25, 1864.

*To all whom it may concern:*

Be it known that I, SAMUEL C. RUNDLETT, of Portland, in the county of Cumberland and State of Maine, have invented a new and Improved Revolving Hand-Rake; and I do hereby declare that the following is a full, clear, and exact description thereof, which will enable others skilled in the art to make and use the same, reference being had to the accompanying drawings, forming part of this specification, in which—

Figure 1:
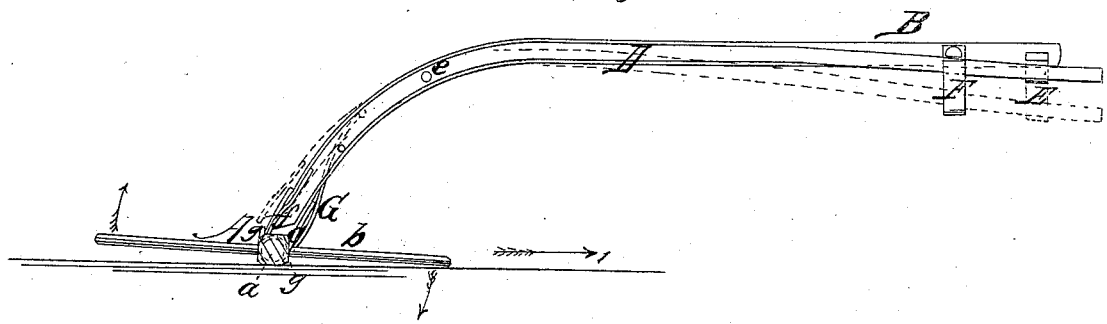
Figure 2:
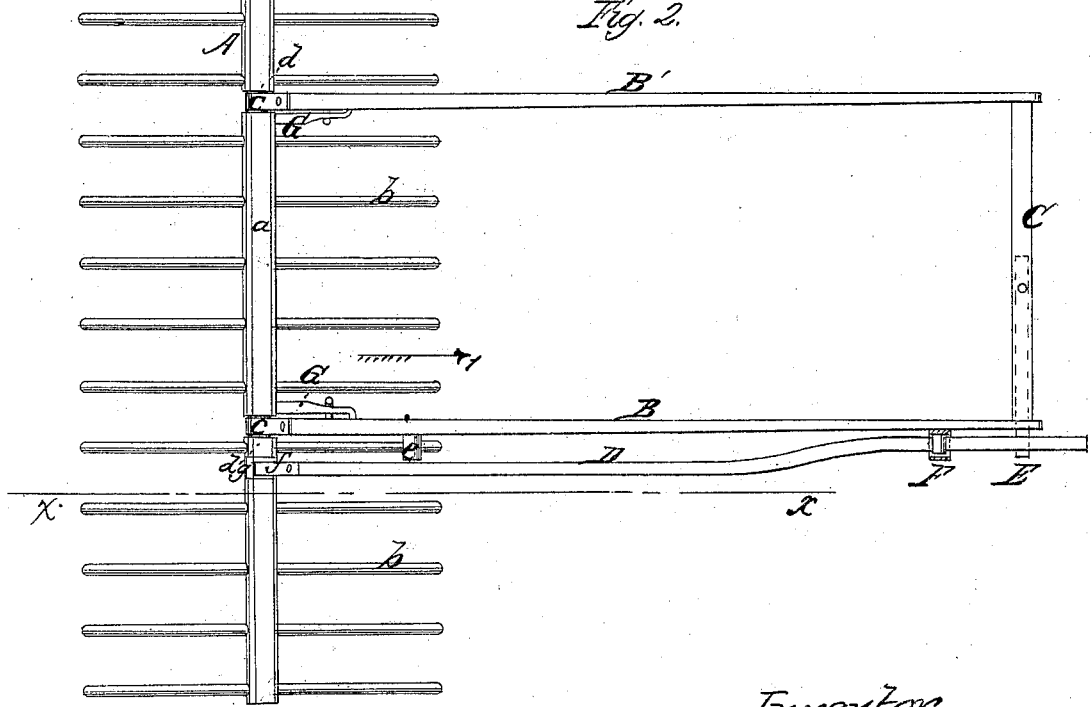

Figure 1 represents a side sectional view of my invention, taken in the line $x\,x$, Fig. 2; Fig. 2, a plan or top view of the same.

Similar letters of reference indicate like parts.

This invention relates to a new and improved revolving hay-rake, designed for manual operation, or to be drawn along by hand.

The object of the invention is to obtain a simple device for the purpose specified, and one which may be operated with facility and without great exertion or labor.

A represents the rake, the head $a$ of which is of square form in its transverse section, with the angles or corners slightly planed off. The teeth $b$ extend through the head $a$ at right angles, and project from it at equal distances from two opposite sides, as shown in both figures.

B B' represent two parallel curved arms, the front ends of which are connected by a cross-bar, C, and the back ends connected by metallic straps $c\,c$ to journals $d\,d$ on the rake-head $a$, so that the rake-head may turn freely.

To the outer side of the right-hand arm B there is attached by a pivot, $e$, a bar or lever, D, the front end of which projects a short distance in front of the arm B, to which it is attached. This bar or lever is curved like the arms B B', the curvature being at the back ends, and the back end of the lever D has a flat plate, $f$, attached, for projections or lips $g$ $g$ on the head $a$ to catch against.

To the under side of the cross-bar C there is attached a spring, E, which bears against the under side of the lever D, and has a tendency to keep the plate $f$ down in contact with the head $a$.

F is a guide attached to the arm B, and in which the lever D works.

G G are springs, which are attached to the inner sides of the arms B B', and bear against the head $a$ at its front side to catch into notches therein. These springs have a tendency to prevent the teeth $b$ at the front side of the rake-head from moving upward from the surface of the ground.

The operator is between the arms B B' and behind the bar C, the latter being grasped with the left hand, the right hand grasping the arm B, the implement being drawn along in the direction indicated by the arrow 1.

When the rake is filled the operator presses down the front end of the lever D, and thereby throws up the plate $f$ at the rear end of the lever D, so that the lip $g$, which was in contact with $f$, will be free from it and the rake allowed to revolve and discharge its load, the lever D, after the rake has commenced to revolve, being released, so that the other lip, $g$, may catch the plate $f$ of the lever D and hold the rake in a working position after it has completed a half-revolution, the springs G G catching into notches in the side of the head $a$ to hold the front ends of the teeth to the ground.

Thus by this simple arrangement I obtain an efficient revolving hand-rake, one which may be economically constructed and not liable to get out of repair.

I claim as new and desire to secure by Letters Patent—

The revolving rake A, in combination with the arms B B', connected by the cross-bar C, the springs G G, lever D, spring E, and the lips $g\,g$ on the head $a$, and with or without the guide F, all arranged to operate in the manner substantially as and for the purpose set forth.

SAMUEL C. RUNDLETT.

Witnesses:
S. L. CARLETON,
H. L. MESERVEY.